(12) United States Patent
Lin et al.

(10) Patent No.: US 12,722,175 B2
(45) Date of Patent: Sep. 1, 2026

(54) CONTROL STRUCTURE WITH AUTOMATIC RESET FUNCTION WHEN WATER IS TURNED OFF AND WATER OUTLET DEVICE WITH AUTOMATIC RESET FUNCTION WHEN WATER IS TURNED OFF

(71) Applicant: Xiamen Solex High-Tech Industries Co., Ltd., Xiamen (CN)

(72) Inventors: Xiaolong Lin, Xiamen (CN); Daqiang Zhang, Xiamen (CN); Fengde Lin, Xiamen (CN); Donghai Chen, Xiamen (CN)

(73) Assignee: Xiamen Solex High-Tech Industries Co., Ltd., Xiamen (CN)

( * ) Notice: Subject to any disclaimer, the term of this patent is extended or adjusted under 35 U.S.C. 154(b) by 156 days.

(21) Appl. No.: 18/786,683

(22) Filed: Jul. 29, 2024

(65) Prior Publication Data

US 2025/0050366 A1 Feb. 13, 2025

(30) Foreign Application Priority Data

Aug. 10, 2023 (CN) ........................ 202311003896.4

(51) Int. Cl.

| | |
|---|---|
| ***B05B 12/02*** | (2006.01) |
| ***B05B 12/16*** | (2018.01) |
| ***E03C 1/04*** | (2006.01) |
| ***F16K 21/06*** | (2006.01) |

(52) U.S. Cl.

CPC .............. *B05B 12/02* (2013.01); *B05B 12/16* (2018.02); *E03C 1/0404* (2013.01); *F16K 21/06* (2013.01); *Y10T 137/9464* (2015.04)

(58) Field of Classification Search

CPC ....... B05B 12/002; B05B 12/02; B05B 12/16; E03C 1/0404; E03C 1/0405; Y10T 137/9464; F16K 21/04; F16K 21/06

See application file for complete search history.

(56) References Cited

U.S. PATENT DOCUMENTS

| | | | | |
|---|---|---|---|---|
| 5,383,604 A * | 1/1995 | Boesch | ................. | B05B 1/1618 239/447 |
| 2022/0275611 A1* | 9/2022 | Wang | .................... | E03C 1/0405 |

FOREIGN PATENT DOCUMENTS

| | | | |
|---|---|---|---|
| CN | 109681672 A * | 4/2019 | .......... F16K 11/0746 |
| CN | 112275481 A * | 1/2021 | ........... B05B 12/002 |
| CN | 115289241 A * | 11/2022 | ............ F16K 31/52 |

(Continued)

*Primary Examiner* — Darren W Gorman

(74) *Attorney, Agent, or Firm* — Cooper Legal Group, LLC

(57) ABSTRACT

A control structure with an automatic reset function when water is turned off includes a movable member, a first elastic member, a fixed member, and a control member. The movable member is configured to move from a first position to a second position when the water is turned on, and the movable member is configured to move from the second position to the first position due to the first elastic member when the water is turned off. When the movable member is at the first position, the movable member and the fixed member are combined to define a one or more first guiding surfaces. The control member is driven by a second elastic member to cooperate with the one or more first guiding surfaces to enable the control member to move to an initial position along an extending direction of the one or more first guiding surfaces.

20 Claims, 11 Drawing Sheets

(56) References Cited

FOREIGN PATENT DOCUMENTS

| | | | | | |
|---|---|---|---|---|---|
| CN | 116221471 A | * | 6/2023 | ............. | F16K 21/06 |
| CN | 117654793 A | * | 3/2024 | ........... | B05B 12/002 |
| CN | 119195281 A | * | 12/2024 | ............. | B05B 1/185 |

* cited by examiner

CONTROL STRUCTURE WITH AUTOMATIC RESET FUNCTION WHEN WATER IS TURNED OFF AND WATER OUTLET DEVICE WITH AUTOMATIC RESET FUNCTION WHEN WATER IS TURNED OFF

RELATED APPLICATIONS

This application claims priority to Chinese patent application number 202311003896.4, filed on Aug. 10, 2023. Chinese patent application number 202311003896.4 is incorporated herein by reference.

FIELD OF THE DISCLOSURE

The present disclosure relates to a sanitary product, in particular to a water outlet device.

BACKGROUND OF THE DISCLOSURE

With the improvement of people's living standards, more and more water outlet devices have been incorporated into home decor, such as kitchen faucets, shower heads, and countertop faucets. These water outlet devices often come with more than one water spray pattern and multiple water flow rates. Users can switch the water spray patterns and the water flow rates through various control components, catering to different usage scenarios. However, these functionalities bring an increase in the number of control buttons, making operation more cumbersome.

After turning off the water, users often need to manually reset the water flow buttons. If not reset, the next time the water is turned on, it might be in a high-flow state, causing unnecessary inconveniences. Since users often forget to manually reset the water flow buttons after turning off the water, the overall user experience is negatively affected.

BRIEF SUMMARY OF THE DISCLOSURE

The technical problem to be solved by the present disclosure is to provide a control structure with an automatic reset function when water is turned off, ensuring that the control structure automatically returns to its initial state.

In order to solve the above technical problems, the present disclosure provides the control structure with the automatic reset function when the water is turned off comprising a movable member, a first elastic member, a fixed member, and a control member.

The movable member is configured to move from a first position to a second position when the water is turned on, and the movable member is configured to move from the second position to the first position due to the first elastic member when the water is turned off. When the movable member is at the first position, the movable member and the fixed member are combined to define one or more first guiding surfaces, The control member is driven by a second elastic member to cooperate with the one or more first guiding surfaces to enable the control member to move to an initial position along an extending direction of the one or more first guiding surfaces.

In a preferred embodiment, when the movable member is at the second position, the movable member and the fixed member are combined to define one or more second guiding surfaces.

In a preferred embodiment, the one or more first guiding surfaces are continuous inclined surfaces, and the one or more second guiding surfaces are stepped surfaces.

In a preferred embodiment, a side of the fixed member facing the control member comprises one or more first inclined surfaces, and a side of the movable member facing the control member comprises one or more second inclined surfaces.

In a preferred embodiment, the movable member is configured to move from the first position to the second position along an axial direction of the control structure, or the movable member is configured to move from the first position to the second position along a radial direction of the control structure.

In a preferred embodiment, the side of the fixed member facing the control member comprises a plurality of first ribs extending along an axial direction of the control structure, and each of the plurality of first ribs comprises a first portion and a second portion. A width of the first portion is wider than a width of the second portion so as to define a first region and a second region on two sides of the second portion along a width direction of the second portion.

In a preferred embodiment, the side of the movable member facing the control member comprises a plurality of second ribs extending along the axial direction of the control structure, and a passage is defined between two adjacent first ribs of the plurality of first ribs and is configured for insertion of a corresponding one of the plurality of second ribs.

In a preferred embodiment, each of the plurality of second ribs comprises an insertion portion with a width smaller than a width of the passage and an extension portion with a width larger than the width of the insertion portion. A protruding part of the extension portion relative to the insertion portion is disposed in the first region, so as to define a groove for the control member to move in and out along the axial direction of the control structure.

In a preferred embodiment, a bottom of the second portion and a bottom of the extension portion respectively define the one or more first inclined surfaces and the one or more second inclined surfaces. When the movable member is at the first position, a top of the extension portion is spaced apart from the first portion by a specific distance. When the movable member is at the second position, the top of the extension portion and the first portion abut each other to form an interlocked connection.

In a preferred embodiment, when the movable member is at the second position, the movable member and the fixed member are combined to define a plurality of second guiding surfaces.

The control structure comprises an operating member. The operating member is configured to drive the control member to compress the second elastic member and to rotate around an axial direction of the control member, so as to enable a guiding block of the control member to be driven by the second elastic member to be interlocked with stepped surfaces of the one or more second guiding surfaces or to move along an extending direction of the one or more second guiding surfaces to enter the groove, so that a position of the control member in the axial direction of the control structure is configured to be changed.

In a preferred embodiment, the movable member comprises a moving step and a moving frame that are fixedly assembled together, and the moving step comprises the plurality of second ribs.

The moving step extends radially outward to define a protruding edge, the moving frame has a cavity for accommodating the moving step, and an inner wall of the cavity extends radially inward to define a protruding boss abutting a lower surface of the protruding edge.

In a preferred embodiment, the control structure is disposed in a water inlet channel and is configured to control a water outlet flow rate of the water inlet channel.

In a preferred embodiment, the control structure is disposed in a water inlet channel and is configured to control opening and closing of the water inlet channel.

The present disclosure provides a water outlet device with an automatic reset function when water is turned off comprising a water outlet device body, a water path switching assembly, and a flow control assembly. The flow control assembly is the control structure.

Compared with the existing techniques, the technical solution has the following advantages.

The present disclosure provides the control structure with the automatic reset function when the water is turned off. This is achieved by utilizing the changes in the water pressure during the turning off and turning on of the water to alter the position of the movable member. Consequently, this forms either the one or more first guiding surfaces or the one or more second guiding surfaces between the movable member and the fixed member. When the control member cooperates with the one or more first guiding surfaces, the control member moves along the extending direction of the one or more first guiding surfaces, ultimately reaching the highest point of the one or more first guiding surfaces and achieving a purpose of automatically resetting the control member when the water is turned off. This ensures that the control structure is at the initial position after turning off the water, effectively avoiding the occurrence of misoperation.

DETAILED DESCRIPTION OF THE EMBODIMENTS

Figure 1:
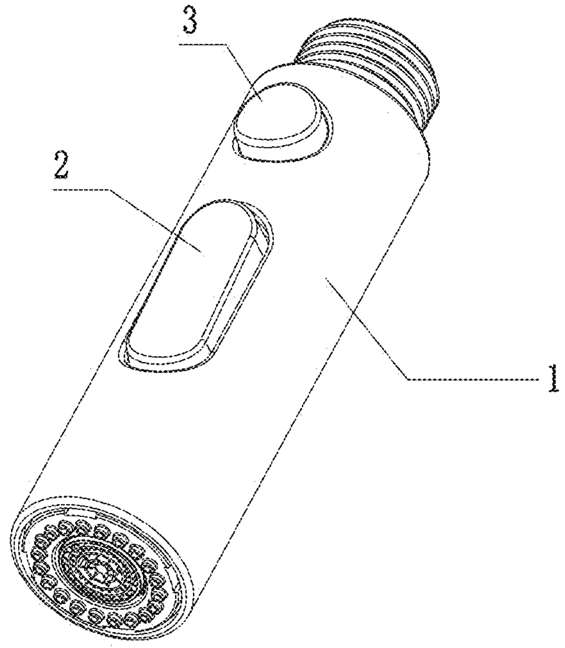
FIG. 1 is a perspective view in a preferred embodiment of the present disclosure.
Figure 2:
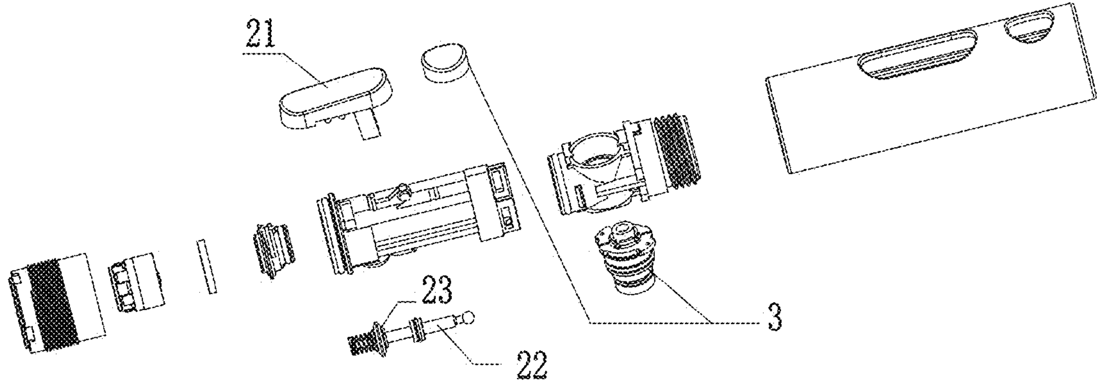
FIG. 2 is an exploded view in the preferred embodiment of the present disclosure.
Figure 3:
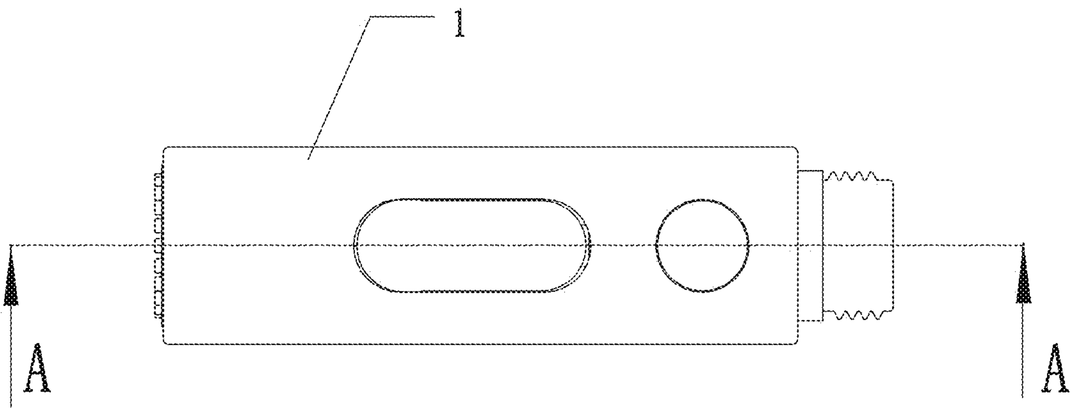
FIG. 3 is a top-down view in the preferred embodiment of the present disclosure.

The following will clearly and completely describe the technical solutions in the embodiments of the present disclosure with reference to the accompanying drawings. Obviously, the described embodiments are only a portion of the embodiments of the present disclosure, and not all of the embodiments. Based on the embodiments of the present disclosure, all other embodiments obtained by those of ordinary skill in the art without creative work fall within the protection scope of the present disclosure.

In the description of the present disclosure, it should be noted that the terms “upper”, “lower”, “inner”, “outer”, “top end”, “bottom end”, etc. indicate the orientation or positional relationship based on the orientation shown in the drawings. The positional relationship is only for the convenience of describing the present disclosure and simplifying the description, rather than indicating or implying that the referenced device or element must have a specific orientation, be constructed, and be operated in a specific orientation. Therefore, the positional relationship should not be understood as a limitation of the present disclosure. In addition, the terms “first” and “second” are only used for descriptive purposes and should not be understood as indicating or implying relative importance.

In the description of the present disclosure, it should be noted that the terms “installed”, “provided with”, “sleeved/connected”, “connected”, etc., should be understood broadly. For example, “connected” can be a wall hanging connection, a detachable connection, or an integral connection, a mechanical connection, an electrical connection, a direct connection, or an indirect connection through an intermediate medium, and it can be a connection between two members. For those of ordinary skill in the art, the specific meaning of the above terms in the present disclosure can be understood under specific conditions.

Embodiment 1

Referring to FIGS. 1-20, this embodiment provides a water outlet device with an automatic reset function when water is turned off, comprising a water outlet device body 1, a water path switching assembly 2, and a flow control assembly. The flow control assembly is a control structure 3 configured to be automatically reset when the water is turned off.

The water outlet device body 1 comprises a water inlet channel 11, a first water outlet channel 12, and a second water outlet channel 13. The water path switching assembly 2 is configured to connect the first water outlet channel 12 or the second water outlet channel 13 to the water inlet channel 11 to switch a water flow pattern of the water outlet device.

Specifically, the water path switching assembly 2 in this embodiment comprises a lever-type switch 21 and a switching shaft 22. The switching shaft 22 is arranged along an axial direction of the water outlet device body 1. The lever-type switch 21 is configured to pull the switching shaft 22 to enable the switching shaft 22 to reciprocate along the axial direction of the water outlet device body 1. The first water outlet channel 12 and the second water outlet channel 13 are arranged concentrically, and a side wall of the switching shaft 22 is disposed with a sealing member 23. In this way, the switching shaft 22 enables a communication junction between the first water outlet channel 12 and the water inlet channel 11 or a communication junction between the second water outlet channel 13 and the water inlet channel 11 to be sealed during reciprocating movement of the switching shaft 22 to switch the water flow pattern. In this embodiment, the first water outlet channel 12 is for shower water, and an aerator is disposed at a distal end of the second water outlet channel 13 to produce aerated water.

The control structure 3 is disposed in the water inlet channel 11 and is configured to control a water passing area of the water inlet channel 11 to achieve switching of a water outlet flow rate. Additionally, after turning off the water, the control structure 3 automatically resets to an initial position. This ensures that each time the water is turned on, the water outlet flow rate is approximately the same, preventing situations where the water outlet flow rate is too high or too low due to the user forgetting to reset the control structure 3, thereby enhancing the user experience.

Figure 11:
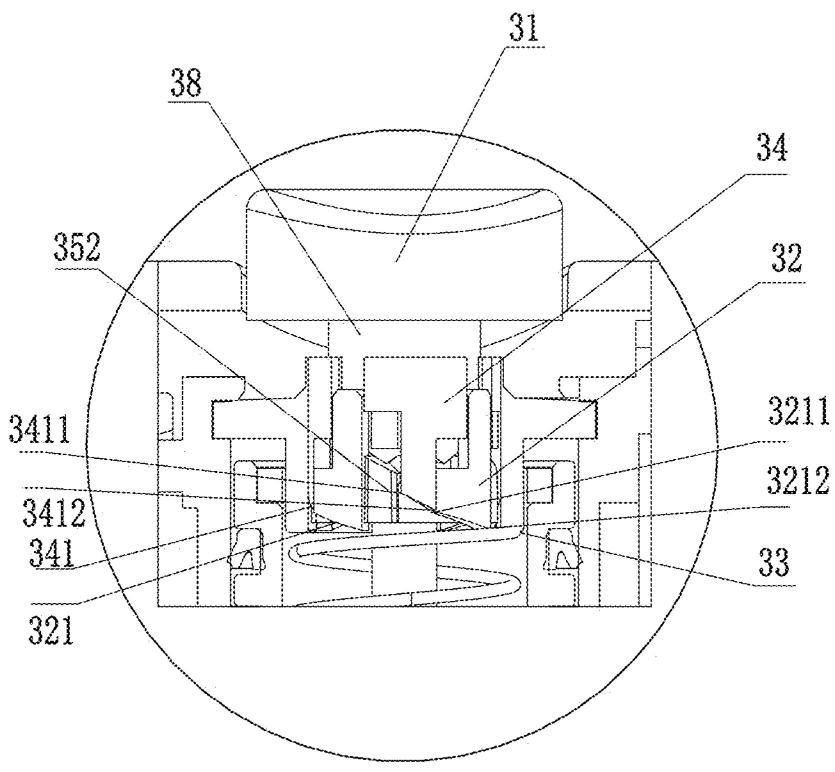
FIG. 11 is a partially enlarged view of FIG. 10.
Figure 12:
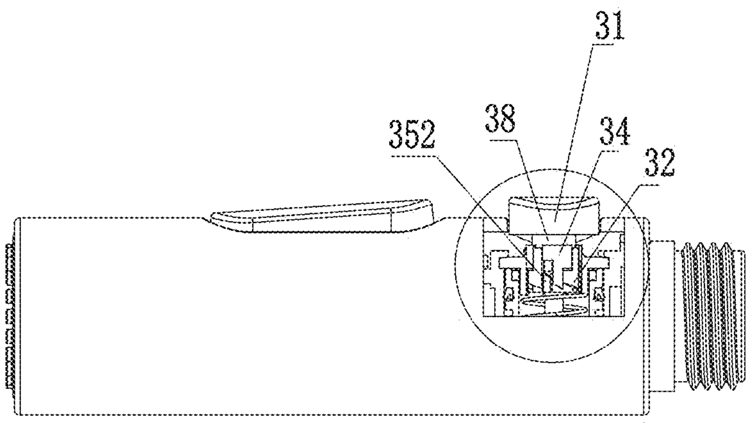
FIG. 12 is a partial cross-sectional view corresponding to a second section line B of the flow control assembly in a water turned on state in the preferred embodiment of the present disclosure.
Figure 13:
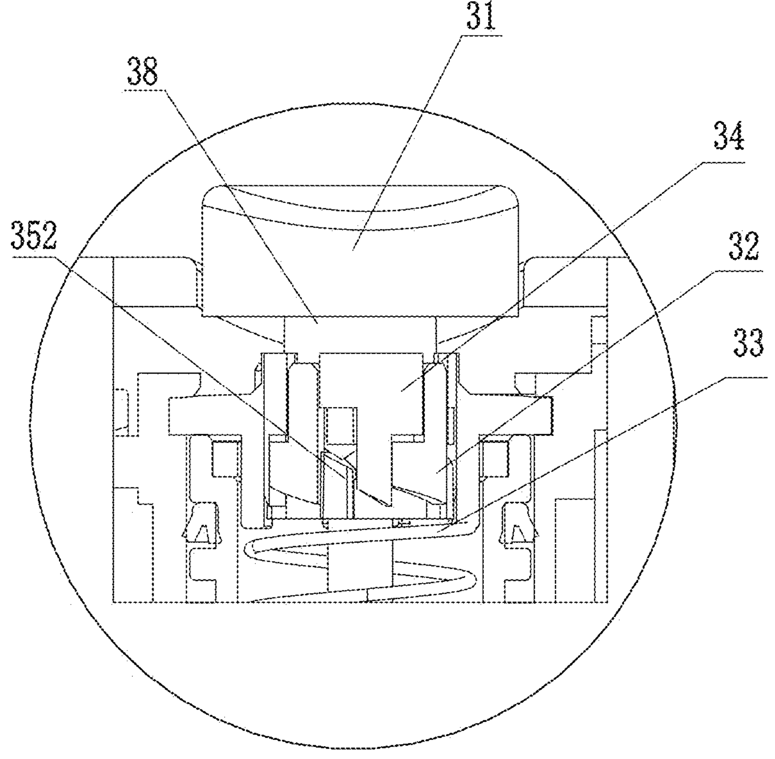
FIG. 13 is a partially enlarged view of FIG. 12.
Figure 14:
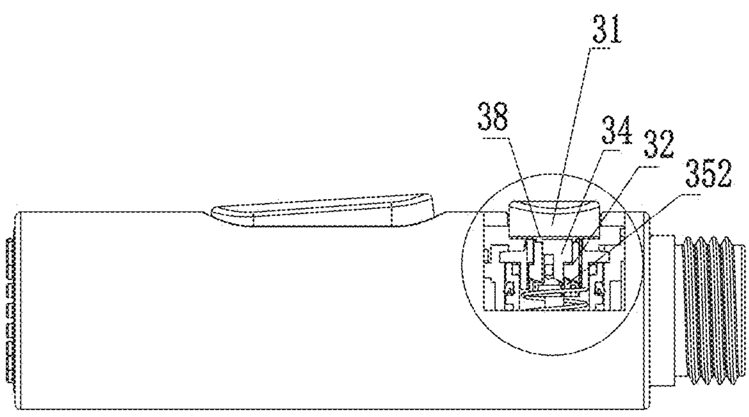
FIG. 14 is a partial cross-sectional view corresponding to a second section line B of the flow control assembly in the water turned on state in the preferred embodiment of the present disclosure, when the flow control assembly performs water flow rate switching.

To achieve the aforementioned effect, the control structure 3 in this embodiment comprises an operating member 31, a movable member 32, a first elastic member 33, a fixed member 34, and a control member 35. In this embodiment, the operating member 31 is a button, and the movable member 32 has translational freedom along an axial direction of the button. This allows the movable member 32 to move from a first position to a second position due to water pressure when the water is turned on. FIG. 11 shows a schematic of the first position. FIG. 13 shows a schematic of the second position, in which the first elastic member 33 is compressed to accumulate an elastic reset force. Therefore, when the water is turned off, the movable member 32 is driven by the first elastic member 33 to move from the second position to the first position. When the movable member 32 is at the first position, the movable member 32 and the fixed member 34 are combined to define one or more first guiding surfaces. The one or more first guiding surfaces are continuous inclined surfaces.

The control member 35 is driven by a second elastic member 36 to cooperate with the one or more first guiding surfaces to enable the control member 35 to move along an extending direction of the one or more first guiding surfaces, and the control member 35 finally moves to a highest point of the one or more first guiding surfaces, thereby enabling the control member 35 to be automatically reset when the water is turned off. This ensures that the control structure 3 is at the initial position after turning off the water, effectively avoiding the occurrence of misoperation.

To define the one or more first guiding surfaces as described above, a side of the fixed member 34 facing the control member 35 comprises one or more first inclined surfaces 341, and a side of the movable member 32 facing the control member 35 comprises one or more second inclined surfaces 321. When the movable member 32 is at the first position, the one or more first inclined surfaces 341 and the one or more second inclined surfaces 321 are combined to define the one or more first guiding surfaces. Taking the water inlet channel 11 as a reference position, a first end point of the one or more first inclined surfaces 341 higher than the water inlet channel 11 is a high point 3411 of the one or more first inclined surfaces 341, a second end point of the one or more first inclined surfaces 341 lower than the water inlet channel 11 is a low point 3412 of the one or more first inclined surfaces 341, a third end point of the one or more second inclined surfaces 321 higher than the water inlet channel 11 is a high point 3211 of the one or more second inclined surfaces 321, a fourth end point of the one or more second inclined surfaces 321 lower than the water inlet channel 11 is a low point 3212 of the one or more second inclined surfaces 321, and the one or more first inclined surfaces 341 and the one or more second inclined surfaces 321 are combined to define the one or more first guiding surfaces. The one or more first guiding surface can be the continuous inclined surfaces, and the continuous inclined surfaces can be understood as either fully continuous inclined surfaces or approximately continuous inclined surfaces. The fully continuous inclined surfaces mean that the low point 3412 of the one or more first inclined surfaces is at the same height as the high point 3211 of the one or more second inclined surfaces. Alternatively, the approximately continuous inclined surfaces for the one or more first guiding surfaces mean that the low point 3412 of the one or more first inclined surfaces is higher than the high point 3211 of the one or more second inclined surfaces. Specifically, the side of the fixed member 34 facing the control member 35 comprises a plurality of first ribs 342 extending along an axial direction of the control structure 3, and each of the plurality of first ribs 342 comprises a first portion 3421 and a second portion 3422. A width of the first portion 3421 is wider than a width of the second portion 3422 so as to define a first region 34221 and a second region 34222 on two sides of the second portion 3422 along a width direction of the second portion 3422. Correspondingly, the side of the movable member 32 facing the control member 35 comprises a plurality of second ribs 322 extending along the axial direction of the control structure 3, and a passage is defined between two adjacent first ribs 342 of the plurality of first ribs 342 and is configured for insertion of a corresponding one of the plurality of second ribs 322. Each of the plurality of second ribs 322 comprises an insertion portion 3221 with a width smaller than a width of the passage and an extension portion 3222 with a width larger than the width of the insertion portion 3221. A protruding part 32221 of the extension portion 3222 relative to the insertion portion 3221 is disposed in the first region 34221 of one of the plurality of first ribs 342, so that a part 32222 of the extension portion 3222 disposed outside of the first region 34221 is combined with the second region 34222 of another of the plurality of first ribs 342 to define a groove 37 for the control member 35 to move in and out along the axial direction of the control structure 3. In this way, when the control member 35 enters the groove 37, the control member 35 moves to a highest position. At this time, the second elastic member 36 is in a recovery state, thereby occupying part of the water inlet channel 11 and reducing a flow rate (i.e., the water outlet flow rate) of the water inlet channel 11.

A bottom of the second portion 3422 and a bottom of the extension portion 3222 respectively define the one or more first inclined surfaces 341 and the one or more second inclined surfaces 321. When the movable member 32 is at the first position, a top of the extension portion 3222 is spaced apart from the first portion 3421 for a certain distance, and the one or more first inclined surfaces 341 and the one or more second inclined surfaces 321 are combined to define the one or more first guiding surfaces. In this way, the extension portion 3222 can move upward due to the water pressure when the water is turned on, so that when the movable member 32 is at the second position, the top of the extension portion 3222 and the first portion 3421 abut each other to form an interlocked connection, and the one or more first inclined surfaces 341 and the one or more second inclined surfaces 321 define one or more second guiding surfaces. The one or more second guiding surfaces can be stepped surfaces. The water inlet channel 11 is used as a reference position, and the low point 3412 of the one or more first inclined surfaces is lower than the high point 3211 of the one or more second inclined surfaces.

The operating member 31 is operatively coupled to a pressing member 38, and a side of the pressing member 38 facing the control member 35 comprises a ratchet 381. The control member 35 comprises a flow-limiting rod 351 and a moving-and-sliding block 352 connected to the flow-limiting rod 351. The moving-and-sliding block 352 serves as a guiding block. An outer periphery of the moving-and-sliding block 352 comprises one or more protrusions 3521 that are operatively coupled to the ratchet 381. When the pressing member 38 is driven to move downward by an external force, the ratchet 381 abuts the one or more protrusions 3521 to drive the moving-and-sliding block 352 to rotate a certain angle around the axial direction of the control structure 3, the moving-and-sliding block 352 moves downward along the axial direction of the control structure 3 to be separated from the one or more second guiding surfaces, and the one or more protrusions 3521 of the moving-and-sliding block 352 that have been rotated abut the one or more second guiding surfaces again due to the second elastic member 36, thereby entering the groove 37 along the one or more second guiding surfaces. When the pressing member 38 is pressed again, the ratchet 381 abuts the one or more protrusions 3521 to drive the moving-and-sliding block 352 to rotate a certain angle around the axial direction of the control structure 3, the moving-and-sliding block 352 moves downward along the axial direction of the control structure 3 to be separated from the groove 37, and the one or more protrusions 3521 of the moving-and-sliding block 352 that have been rotated abut the one or more second guiding surfaces again due to the second elastic member 36, thereby abutting a step of the one or more second guiding surfaces at a lowest position. At this time, the flow-limiting rod 351 will completely open the water inlet channel 11, causing the water passing area of the water inlet channel 11 to become larger and the water outlet flow rate to increase. When the user presses the operating member 31 again, the water outlet flow rate becomes smaller again, forming a repeated switching. In this embodiment, the movable member 32 comprises a moving step 323 and a moving frame 324 that are fixedly assembled together. The moving step 323 comprises the plurality of second ribs 322.

The moving step 323 extends radially outward to define a protruding edge 3231, the moving frame 324 has a cavity for accommodating the moving step 323, and an inner wall of the cavity extends radially inward to define a protruding boss 3241 abutting a lower surface of the protruding edge 3231.

A lower end of the fixed member 34 passes through the moving step 323 and enters the cavity, a first end of the first elastic member 33 abuts a gasket 3242 disposed on a bottom of the cavity, and a second end of the first elastic member 33 abuts the lower end of the fixed member 34. A part of the fixed member 34 disposed outside of the cavity extends radially outward to define a position-limiting wall 343 for limiting a raised height of the movable member 32. When the movable member 32 is at the first position, the position-limiting wall 343 is spaced apart from an upper end surface of the moving frame 324 for a certain distance. When the water is turned on, the water pressure drives the movable member 32 to move upward along the axial direction until the position-limiting wall 343 abuts the upper end surface of the moving frame 324. At this time, the movable member 32 moves from the first position to the second position, and the first elastic member 33 is compressed to accumulate an elastic restoring force. In addition, in this embodiment, a side wall of the moving frame 324 and the water outlet device body 1 are sealed by a first Y-shaped ring 3243. A rod part of the flow-limiting rod 351 is inserted into a bottom of the moving frame 324 and is sealed with the moving frame 324 by a second Y-shaped ring 3244.

An entire working process is described as follows.

Figure 4:
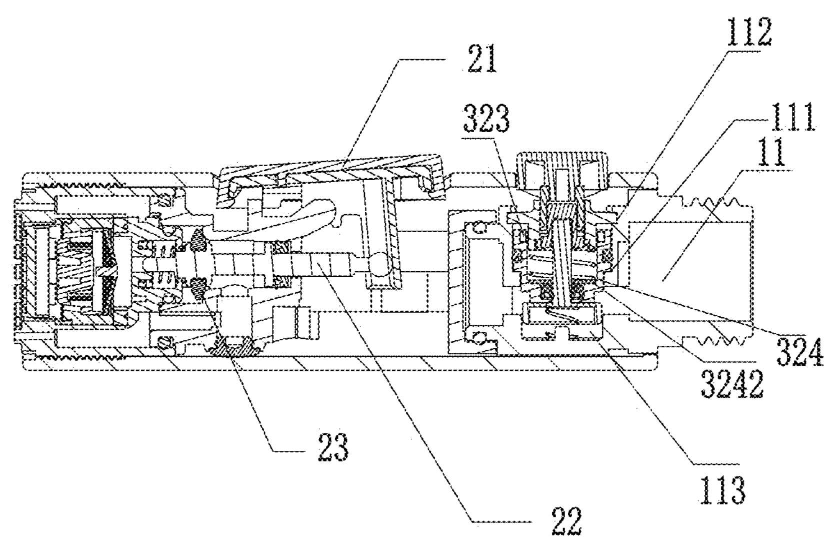
FIG. 4 is a cross-sectional view corresponding to a first section line A-A in an initial state in the preferred embodiment of the present invention.
Figure 5:
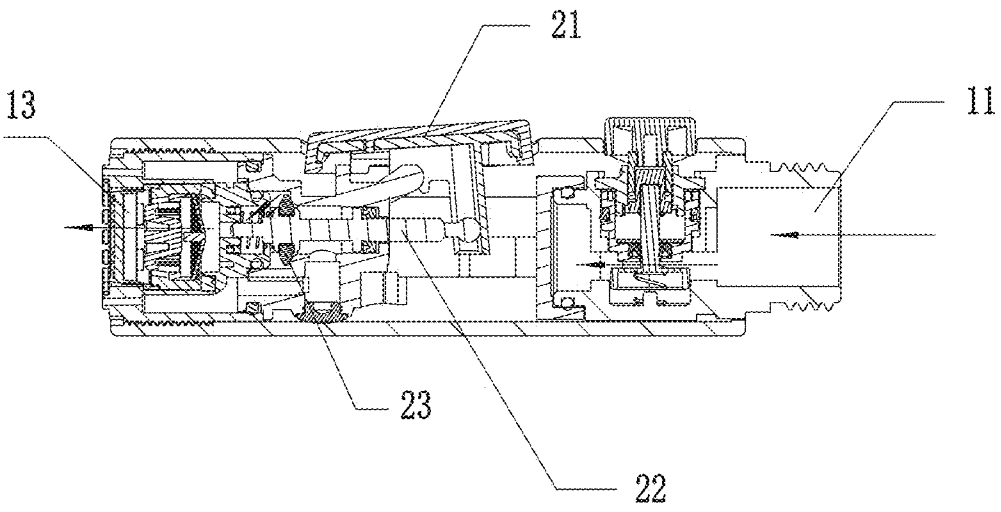
FIG. 5 is a cross-sectional view corresponding to discharging aerated water in the preferred embodiment of the present disclosure.
Figure 6:
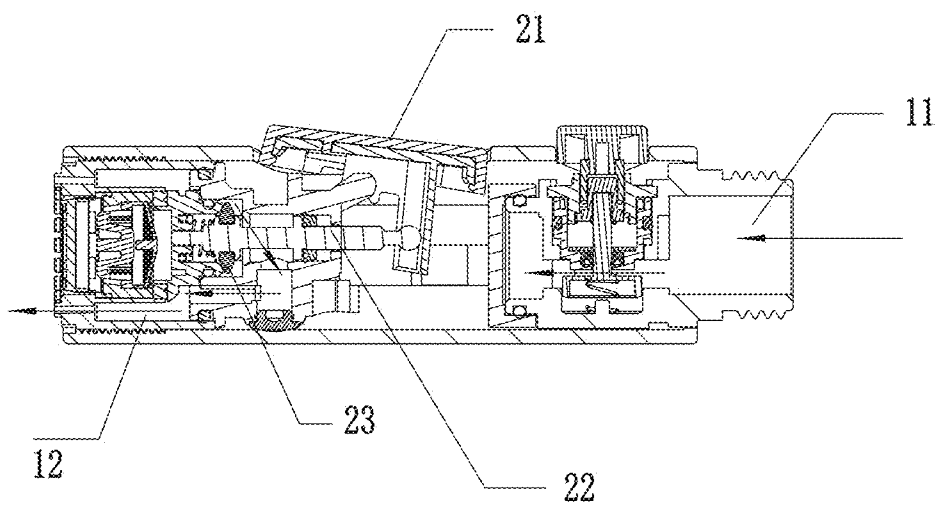
FIG. 6 is a cross-sectional view corresponding to discharging shower water in the preferred embodiment of the present disclosure.
Figure 7:
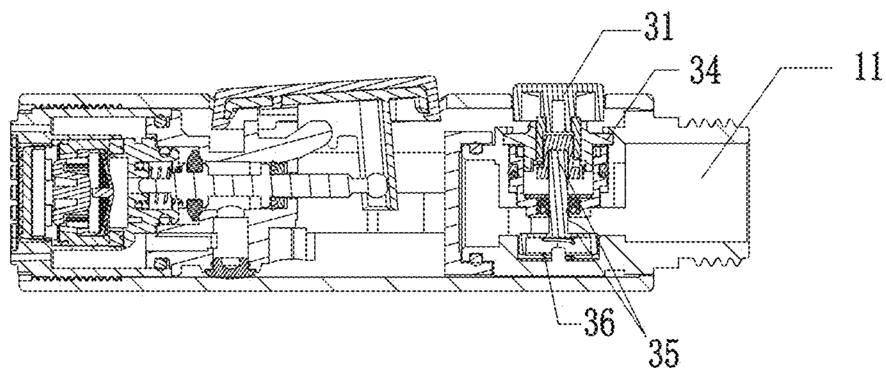
FIG. 7 is a cross-sectional view corresponding to discharging the aerated water with a high-flow state in the preferred embodiment of the present disclosure.
Figure 8:
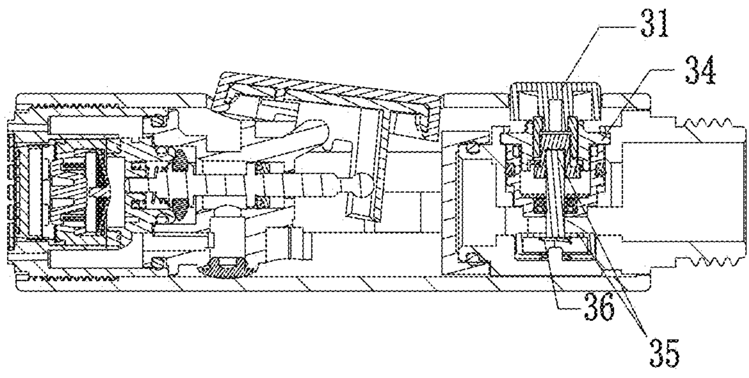
FIG. 8 is a cross-sectional view corresponding to producing the shower water with a high-flow state in the preferred embodiment of the present disclosure.
Figure 9:
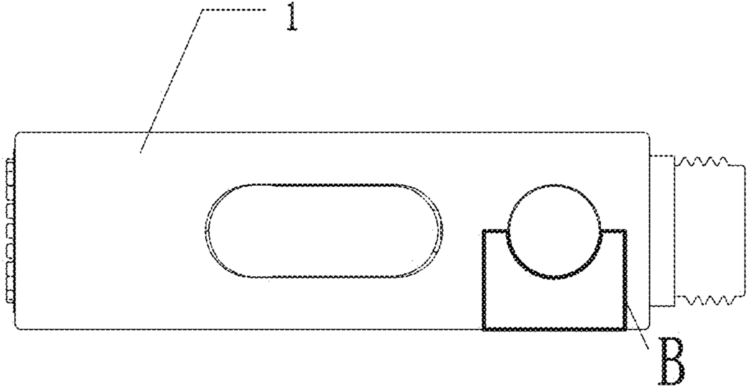
FIG. 9 is a top-down view in the preferred embodiment of the present disclosure.
Figure 10:
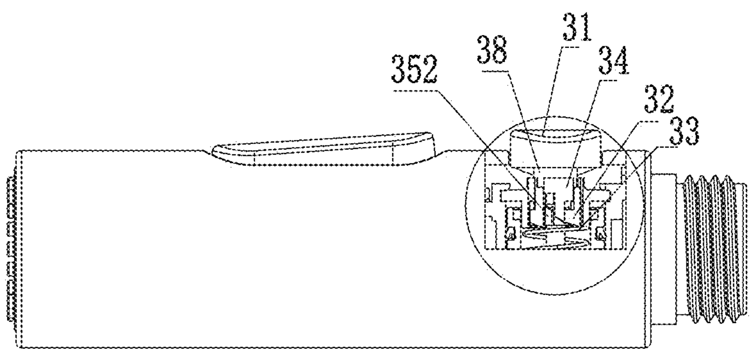
FIG. 10 is a partial cross-sectional view corresponding to a second section line B of a flow control assembly in a water turned off state in the preferred embodiment of the present disclosure.

In an initial state: referring to FIG. 4, the water outlet device body 1 comprises a first position-limiting portion 111, and the moving frame 324 is disposed on the first position-limiting portion 111, so that the moving frame 324 can be fixed without the water pressure. The gasket 3242 is disposed in the moving frame 324, the first elastic member 33 is disposed on the gasket 3242, and the gasket 3242 supplies a supporting force for the first elastic member 33. At this time, the first elastic member 33 is in a natural state in which the first elastic member 33 is not subjected to an external force. The protruding edge 3231 of the moving step 323 is disposed on a top of the moving frame 324 and is fixedly connected to the moving frame 324, so that the moving step 323 can move with the moving frame 324. A bottom of the moving frame 324 corresponding to the top of the moving frame 324 comprises a recessed groove, and the flow-limiting rod 351 passes through the recessed groove, so that the moving frame 324 can move along the flow-limiting rod 351. The water outlet device body 1 comprises a position-limiting groove 113, and a bottom of the flow-limiting rod 351 is disposed in the position-limiting groove 113. The second elastic member 36 is disposed between the position-limiting groove 113 and the bottom of the flow-limiting rod 351, and the bottom of the flow-limiting rod 351 moves along the position-limiting groove 113 due to the second elastic member 36. The water outlet device body 1 comprises a second position-limiting portion 112, and a projecting flange (i.e., the position-limiting wall 343) of the fixed member 34 is disposed on the second position-limiting portion 112, so as to enable the fixed member 34 to be fixedly connected to the water outlet device body 1. The moving frame 324 is located below the projecting flange of the fixed member 34. The moving frame 324 is spaced apart from the projecting flange of the fixed member 34 for a certain distance, or the moving step 323 is spaced apart from the projecting flange of the fixed member 34 for a certain distance. This distance allows for the movement of the moving frame 324 and can be understood as a maximum movement distance of the moving frame 324.

The fixed member 34 has the plurality of first ribs 342, and the plurality of first ribs 342 define the one or more first inclined surfaces 341. The movable member 32 has the plurality of second ribs 322, and the plurality of second ribs 322 define the one or more second inclined surfaces 321. The moving-and-sliding block 352 is located in the groove 37 defined by the plurality of first ribs 342 and the plurality of second ribs 322. The one or more first inclined surfaces 341 and the one or more second inclined surfaces 321 combine to define the one or more first guiding surfaces. As shown in FIG. 11, when the operating member 31 is pressed in the initial state, the moving-and-sliding block 352 has an inclined surface that is matched with the one or more first inclined surfaces 341 and the one or more second inclined surfaces 321. The moving-and-sliding block 352 slides along the one or more second inclined surfaces 321, then along the one or more first inclined surfaces 341, and finally returns to the groove 37. At this time, the low point 3412 of the one or more first inclined surfaces 341 is at the same height as the high point 3211 of the one or more second inclined surfaces 321. Alternatively, the one or more first guiding surfaces can be combined by two inclined surfaces in which the high point 3211 of the one or more second inclined surfaces 321 is lower than the low point 3412 of the one or more first inclined surfaces 341 (relative to the water inlet channel 11). This design allows the moving-and-sliding block 352 to smoothly transition from the one or more second inclined surface 321 to the first one or more inclined surface 341, and finally return to the groove 37. Moreover, pressing the operating member 31 causes the moving-and-sliding block 352 to move up and down, and the moving-and-sliding block 352 stays within the groove 37. In this configuration, no matter how the operating member 31 is pressed to switch gear positions, an initial gear position is kept, achieving a fixed setting for the initial gear position.

In a state of the water being turned on, as shown in FIG. 13, a small amount of water can flow through. Since an elastic coefficient of the second elastic member 36 is greater than an elastic coefficient of the first elastic member 33, at this time, the moving frame 324, due to the water pressure from the water inlet channel 11, cannot compress the second elastic member 36. Therefore, the moving frame 324 moves upward, overcoming the elastic force of the first elastic member 33, along a direction toward the projecting flange of the fixed member 34. At this time, a relative position of the one or more first inclined surfaces 341 and the one or more second inclined surfaces 321 changes, that is, the one or more second inclined surfaces 321 is raised relative to the water inlet channel 11. The high point 3211 of the one or more second inclined surface 321 is higher than the low point 3412 of the first one or more inclined surface 341. The one or more second inclined surfaces 321 and side walls of the plurality of first ribs 342 define the one or more second guiding surfaces, and the one or more second guiding surfaces can be the stepped surfaces. The moving-and-sliding block 352 can be disposed on the stepped surfaces. A depth of the step is less than the depth of the groove 37, allowing for gear position switching.

Figure 15:
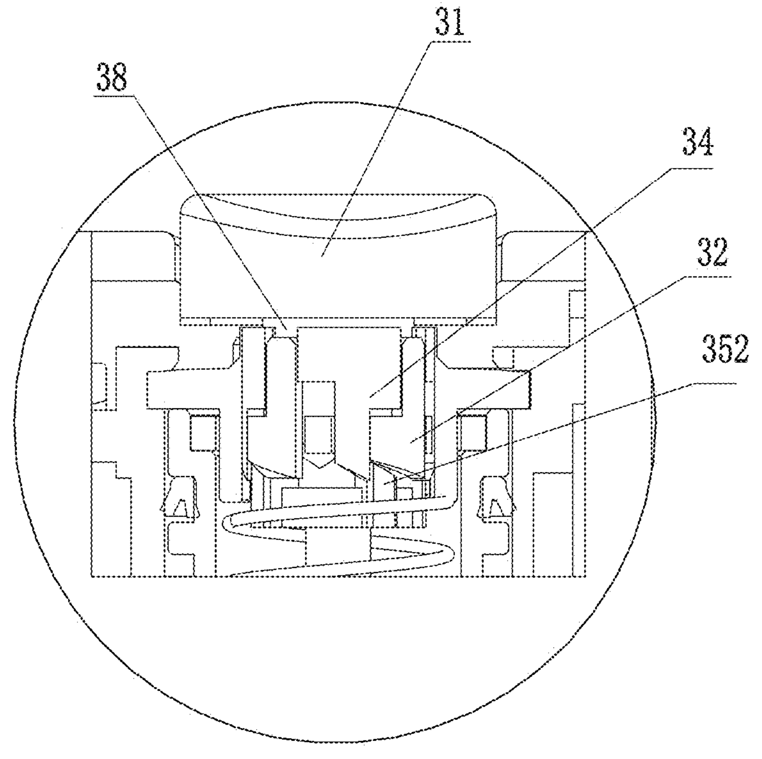
FIG. 15 is a partially enlarged view of FIG. 14.
Figure 16:
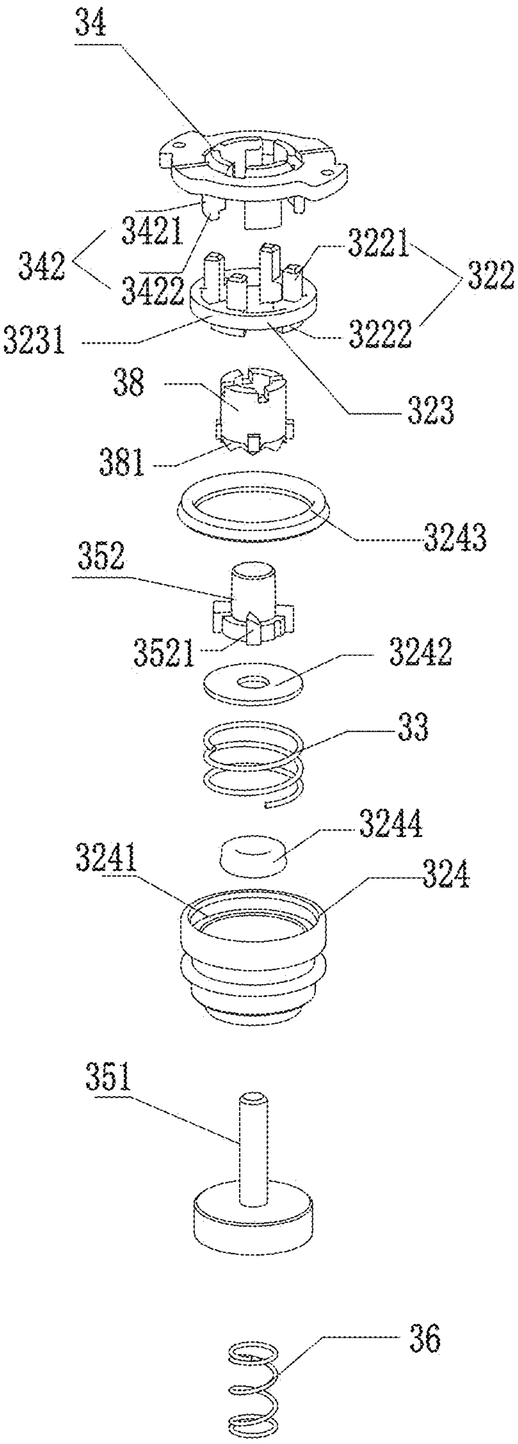
FIG. 16 is an exploded view of the flow control assembly in the preferred embodiment of the present disclosure.
Figure 17:
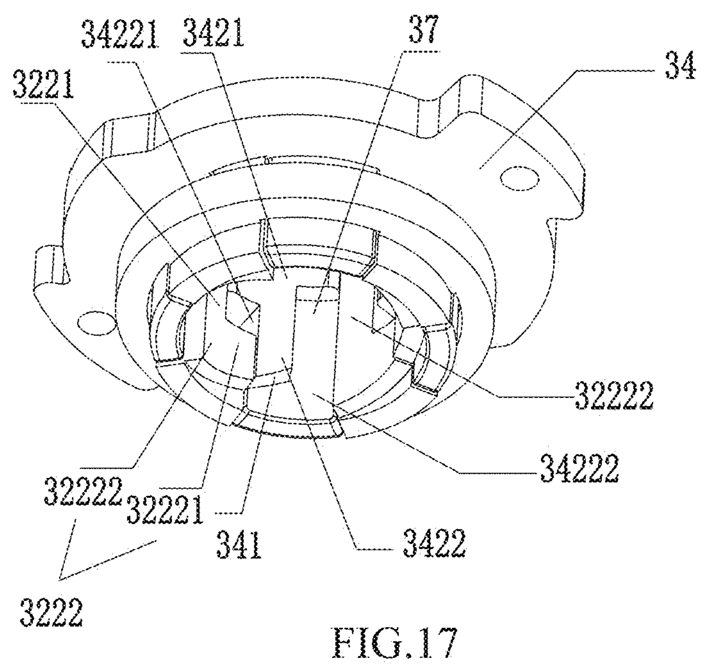
FIG. 17 is a schematic view of a movable member at a first position in the preferred embodiment of the present disclosure.
Figure 18:
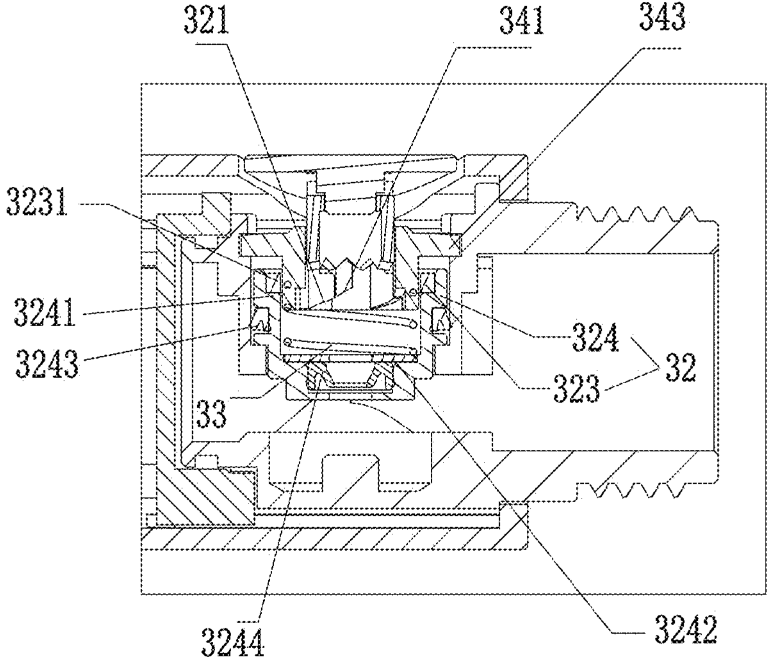
FIG. 18 is a cross-sectional view of the movable member at the first position in the preferred embodiment of the present disclosure.
Figure 19:
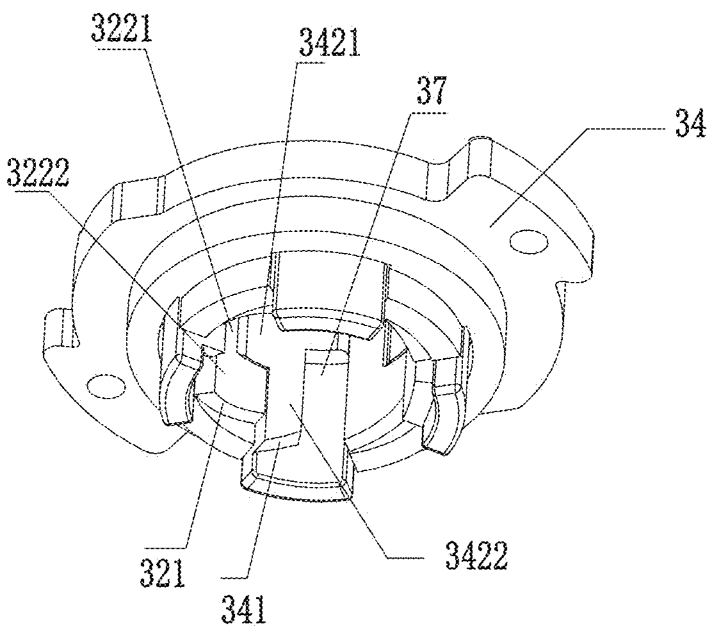
FIG. 19 is a schematic view of the movable member at the second position in the preferred embodiment of the present disclosure.
Figure 20:
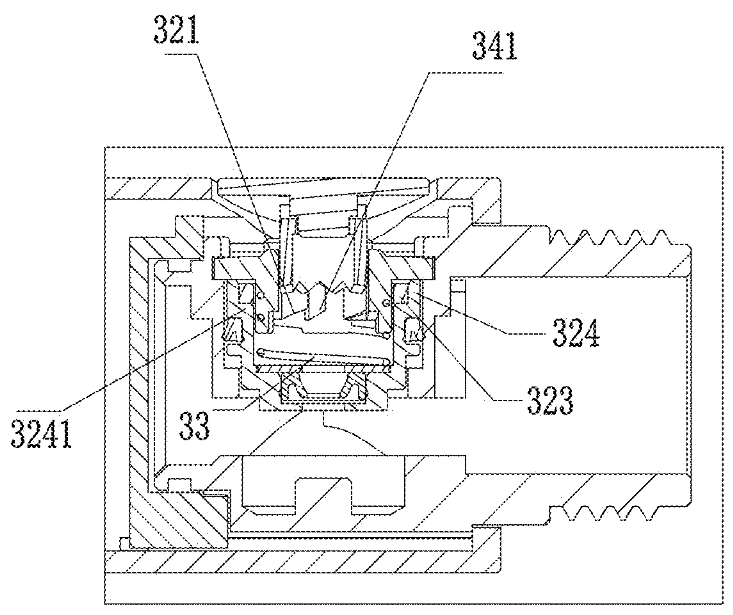
FIG. 20 is a cross-sectional view of the movable member at the second position in the preferred embodiment of the present disclosure.

Gear position switching: As shown in FIG. 15, pressing the operation member 31 can enable the initial state of small flow rate (i.e., the small amount of water) to be changed to a state of large flow rate. The operation member 31 is pressed to indirectly act on the second elastic member 36, causes the moving-and-sliding block 352 to move downward. The moving-and-sliding block 352 completes a rotation of a certain angle under cooperation of the pressing member 38, and the moving-and-sliding block 352 can slide along the one or more second inclined surfaces 321 to be disposed on the stepped steps, completing switching of the small flow rate to the large flow rate.

Pressing the operation member 31 again can realizing switching of the large flow rate to the small flow rate. The moving-and-sliding block 352 completes another rotation of a certain angle under the cooperation of the pressing member 38, and the moving-and-sliding block 352 can slide along the one or more first inclined surfaces 341 to be disposed in the groove 37, completing the switching of the large flow rate to the small flow rate.

A reset state after the water is turned off: the water inlet channel 11 is closed. At this time, the moving frame 324 is no longer subject to the water pressure, and the elastic restoring force of the first elastic member 33 drives the moving frame 324 and the moving step 323 to move downward (i.e., move in a direction of approaching the water inlet channel 11). The moving frame 324 has a downward force on the moving-and-sliding block 325, and the moving-and-sliding block 325 moves downward. The moving frame 324 moves to be interlocked with the first position-limiting portion 111 of the water outlet device body 1, and the one or more second inclined surfaces 321 of the moving frame 324 combines with the one or more first inclined surfaces 341 to define the one or more first guiding surfaces. Since the moving-and-sliding block 325 abuts the one or more second inclined surfaces 321, to push the moving-and-sliding block 325 out of the one or more second guiding surfaces (i.e., the stepped steps), the one or more second inclined surfaces 321 need to be moved to define the continuous inclined surfaces with the one or more first inclined surfaces 341, or the one or more second inclined surfaces 321 are closer to the water inlet channel 11 than the one or more first inclined surfaces 341. The moving-and-sliding block 352 completes a rotation of a certain angle under the cooperation of the pressing member 38 to slide into the groove 37 along the one or more first inclined surfaces 341, reverting to the initial state of the small flow rate.

Embodiment 2

The control member 35 in Embodiment 1 is used to control the water outlet flow rate. In this embodiment, the control member 35 is used to control opening and closing of the water inlet channel 11. That is, when turning off the water, the control member 35 opens the water inlet channel 11. When turning on the water, the user can press the operating member 31 to achieve a repeated switching of turning on and off the water. When turning off the water, it is only necessary to change the flow-limiting rod 351 in the embodiment from partially opening the water inlet channel 11 to completely closing the water inlet channel 11.

Embodiment 3

In Embodiment 1, the movable member 32 moves from the first position to the second position along the axial direction of the control structure 3. In this embodiment, the movable member 32 moves from the first position to the second position along a radial direction of the control structure 3, so that the same effect as in Embodiment 1 can be achieved. In general, as long as the movable member 32 moves from the second position to the first position, the movable member 32 can be combined with the fixed member 34 to form the first guiding surface. To realize the movable member 32 moving along the radial direction, a surface of the movable member 32 subjected to the water pressure can be changed from a bottom to a side wall, so that a direction of movement of the movable member 32 after being subjected to the water pressure is changed from axial to radial. It is also possible to provide in addition a moving member subjected to the water pressure, with a directing-changing fit between the moving member and the movable member 32, so that movement of the moving member is along the axial direction. Through the directing-changing fit, the movable member 32 changes to a movement along the radial direction.

The aforementioned embodiments are merely some embodiments of the present disclosure, and the scope of the disclosure is not limited thereto. Thus, it is intended that the present disclosure cover non-substantive modifications of the present disclosure provided they are made based on the concept within the technical scope disclosed in the present disclosure by any technical person skilled in the art.

What is claimed is:

1. A control structure with an automatic reset function when water is turned off, comprising:
- a movable member,
- a first elastic member,
- a fixed member, and
- a control member, wherein:
  - the movable member is configured to move from a first position to a second position when the water is turned on,
  - the movable member is configured to move from the second position to the first position due to the first elastic member when the water is turned off,
  - when the movable member is at the first position, the movable member and the fixed member are combined to define one or more first guiding surfaces, and
  - the control member is driven by a second elastic member to cooperate with the one or more first guiding surfaces to enable the control member to move to an initial position along an extending direction of the one or more first guiding surfaces.

2. The control structure with the automatic reset function when the water is turned off according to claim 1, wherein:
- when the movable member is at the second position, the movable member and the fixed member are combined to define one or more second guiding surfaces.

3. The control structure with the automatic reset function when the water is turned off according to claim 2, wherein:
- the one or more first guiding surfaces are continuous inclined surfaces, and
- the one or more second guiding surfaces are stepped surfaces.

4. The control structure with the automatic reset function when the water is turned off according to claim 2, wherein:
- a side of the fixed member facing the control member comprises one or more first inclined surfaces, and
- a side of the movable member facing the control member comprises one or more second inclined surfaces.

5. The control structure with the automatic reset function when the water is turned off according to claim 1, wherein:
- the movable member is configured to move from the first position to the second position along an axial direction of the control structure, or
- the movable member is configured to move from the first position to the second position along a radial direction of the control structure.

6. The control structure with the automatic reset function when the water is turned off according to claim 4, wherein:
- the side of the fixed member facing the control member comprises a plurality of first ribs extending along an axial direction of the control structure,
- each of the plurality of first ribs comprises a first portion and a second portion, and
- a width of the first portion is wider than a width of the second portion so as to define a first region and a second region on two sides of the second portion along a width direction of the second portion.

7. The control structure with the automatic reset function when the water is turned off according to claim 6, wherein:
- the side of the movable member facing the control member comprises a plurality of second ribs extending along the axial direction of the control structure, and
- a passage is defined between two adjacent first ribs of the plurality of first ribs and is configured for insertion of a corresponding one of the plurality of second ribs.

8. The control structure with the automatic reset function when the water is turned off according to claim 7, wherein:
- each of the plurality of second ribs comprises an insertion portion with a width smaller than a width of the passage and an extension portion with a width larger than the width of the insertion portion, and
- a protruding part of the extension portion relative to the insertion portion is disposed in the first region, so as to define a groove for the control member to move in and out along the axial direction of the control structure.

9. The control structure with the automatic reset function when the water is turned off according to claim 8, wherein:
- a bottom of the second portion and a bottom of the extension portion respectively define the one or more first inclined surfaces and the one or more second inclined surfaces,
- when the movable member is at the first position, a top of the extension portion is spaced apart from the first portion by a specific distance, and
- when the movable member is at the second position, the top of the extension portion and the first portion abut each other to form an interlocked connection.

10. The control structure with the automatic reset function when the water is turned off according to claim 9, wherein:
- the control structure comprises an operating member, and
- the operating member is configured to drive the control member to compress the second elastic member and to rotate around an axial direction of the control member, so as to enable a guiding block of the control member to be driven by the second elastic member to be interlocked with stepped surfaces of the one or more second guiding surfaces or to move along an extending direction of the one or more second guiding surfaces to enter the groove, so that a position of the control member in the axial direction of the control structure is configured to be changed.

11. The control structure with the automatic reset function when the water is turned off according to claim 7, wherein:
- the movable member comprises a moving step and a moving frame that are fixedly together,
- the moving step comprises the plurality of second ribs,
- the moving step extends radially outward to define a protruding edge,
- the moving frame has a cavity for accommodating the moving step, and
- an inner wall of the cavity extends radially inward to define a protruding boss abutting a lower surface of the protruding edge.

12. The control structure with the automatic reset function when the water is turned off according to claim 1, wherein:

the control structure is disposed in a water inlet channel and is configured to control a water outlet flow rate of the water inlet channel.

13. The control structure with the automatic reset function when the water is turned off according to claim 5, wherein: the control structure is disposed in a water inlet channel and is configured to control a water outlet flow rate of the water inlet channel.

14. The control structure with the automatic reset function when the water is turned off according to claim 6, wherein: the control structure is disposed in a water inlet channel and is configured to control a water outlet flow rate of the water inlet channel.

15. The control structure with the automatic reset function when the water is turned off according to claim 9, wherein: the control structure is disposed in a water inlet channel and is configured to control a water outlet flow rate of the water inlet channel.

16. The control structure with the automatic reset function when the water is turned off according to claim 1, wherein: the control structure is disposed in a water inlet channel and is configured to control opening and closing of the water inlet channel.

17. The control structure with the automatic reset function when the water is turned off according to claim 5, wherein: the control structure is disposed in a water inlet channel and is configured to control opening and closing of the water inlet channel.

18. The control structure with the automatic reset function when the water is turned off according to claim 6, wherein: the control structure is disposed in a water inlet channel and is configured to control opening and closing of the water inlet channel.

19. The control structure with the automatic reset function when the water is turned off according to claim 9, wherein: the control structure is disposed in a water inlet channel and is configured to control opening and closing of the water inlet channel.

20. A water outlet device with an automatic reset function when water is turned off, comprising:
a water outlet device body,
a water path switching assembly, and
a flow control assembly, wherein:
the flow control assembly is the control structure according to claim 1.

* * * * *